US011539919B1

(12) United States Patent
Rao et al.

(10) Patent No.: US 11,539,919 B1
(45) Date of Patent: Dec. 27, 2022

(54) DYNAMIC CLOUD VIDEO COMPOSITION

(71) Applicant: Amazon Technologies, Inc., Seattle, WA (US)

(72) Inventors: Siddhartha Shankara Rao, Seattle, WA (US); Tobias DiPasquale, King of Prussia, PA (US); John Joseph Dunne, Bremerton, WA (US); Jennie Tietema, Seattle, WA (US); Ivan Marcin, Palo Alto, CA (US); Richard Newman, Whitman, WA (US); Giridhar Kalpathy Narayanan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/117,948

(22) Filed: Dec. 10, 2020

(51) Int. Cl.
*H04N 7/15* (2006.01)
*H04N 21/44* (2011.01)
*H04N 5/262* (2006.01)
*H04N 21/61* (2011.01)
*H04N 21/6405* (2011.01)

(52) U.S. Cl.
CPC .......... *H04N 7/152* (2013.01); *H04N 5/2624* (2013.01); *H04N 21/44016* (2013.01); *H04N 21/6131* (2013.01); *H04N 21/6405* (2013.01)

(58) Field of Classification Search
CPC .......... H04N 5/2624; H04N 21/44016; H04N 21/6131; H04N 21/6405; H04L 12/18; H04L 12/1813; H04L 12/1818; H04L 12/1822; H04L 12/1827
USPC .............................................. 348/14.02–14.9
See application file for complete search history.

(56) References Cited

U.S. PATENT DOCUMENTS 10,397,518 B1 * 8/2019 Wu .................. H04N 19/30
2018/0316768 A1 * 11/2018 Goldsmith .............. H04L 67/52

* cited by examiner

*Primary Examiner* — Maria El-Zoobi
(74) *Attorney, Agent, or Firm* — BakerHostetler

(57) ABSTRACT

Implementations for combining at least two video streams received from devices of a plurality of participants of a video conference into a composite video stream are described. A video conference including the video streams received from the devices of the plurality of participants is established. A capability associated with consuming at least two of the video streams is received from at least one of the devices. The at least two video streams are then combined into a composite video stream based on the capability associated with consuming the at least two video streams. The composite video stream is transmitted to the at least one of the devices.

19 Claims, 7 Drawing Sheets

DYNAMIC CLOUD VIDEO COMPOSITION

BACKGROUND

Currently many meetings are held that involve multiple participants at multiple locations. Thus, such meetings are often handled electronically and may be in the form of video conferencing among the multiple participants. The video conferences are generally hosted by one or more hosting servers with which the multiple participants communicate over a network, such as, for example, the Internet. The multiple participants generally communicate with the hosting servers using electronic devices such as, for example, smart phones, tablets, computers, etc. Traditionally, the video feeds from all of the participants are individually sent to the device of each participant. However, processing multiple video streams may not be possible for some or all of the devices of the participants of the video conference.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

This disclosure describes techniques and architecture for combining multiple video streams using a media conferencing service based on capabilities of one or more devices that use the media conferencing service. Traditionally, each device participating in a media conference will capture a video stream, such as a video of a user of the device or content being displayed on the device, and transmit that video stream to the media conferencing service. The media conferencing service will then forward some or all of the individual video streams to each device participating in the media conference. However, every device participating in the media conference may not be able to consume a plurality of video streams individually, such as consuming video tiles of the participants of the media conference, due to lack of hardware capabilities and/or software capabilities, for example. In another example, the network bandwidth available to a device participating in the media conference may not be sufficient to receive the plurality of video streams individually without lowering the resolution to an unacceptable level or dropping an unacceptable number of frames.

When either or all of the hardware capabilities, software capabilities, and/or network capabilities of a device do not satisfy a threshold and are, therefore, unacceptable, the media conferencing service may combine at least some of the video streams into a single video stream to reduce the hardware resources, software resources, and/or reduce the network bandwidth required to output the media conference on the device. For example, the processing resources required to decode a single, combined video stream are lower than the processing resources required to decode a plurality of video streams. In addition, the single, combined video stream may be encoded at a particular resolution and/or size, or using a particular encoding standard ("codec") that can be decoded by the software on the device and that requires less bandwidth for transmission and reception. Accordingly, based on the maximum or available hardware capabilities, the available software capabilities, and/the or network capabilities of one or more of the devices participating in the media conference, the media conferencing service can combine at least some of the video streams into a single, composite video stream to enable an acceptable participant experience.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

Figure 1:
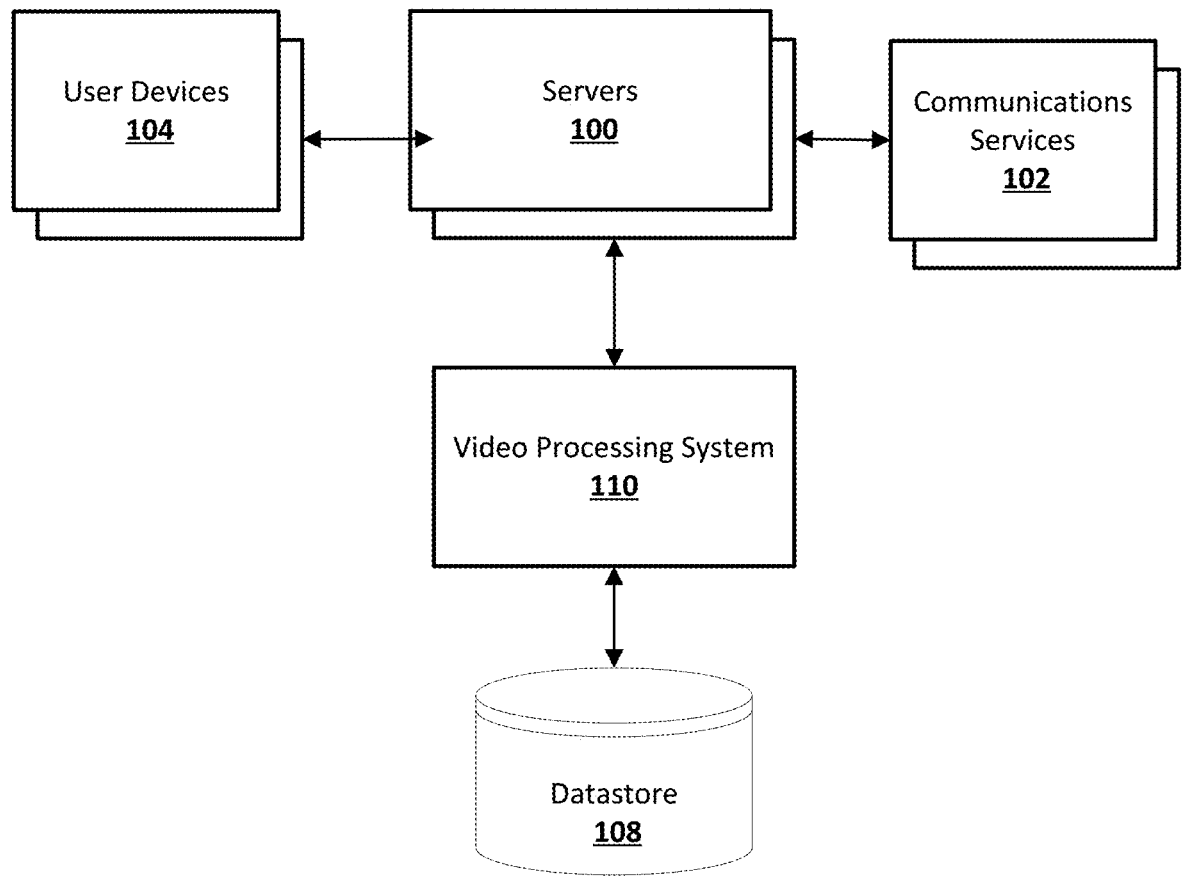
FIG. 1 schematically illustrates a high-level architecture of a video processing system in a media conferencing framework.

FIG. 1 illustrates a high-level architecture of a video processing system in a media conferencing framework, according to an embodiment. One or more servers 100 may serve as a frontend to one or more communication services 102 for various user devices 104. The communication services can be, for example, audio conferencing, video conferencing, chatting, and gaming services. Note that, while communication services 102 are shown outside servers 100 in FIG. 1, one or more of communication services 102 may be implemented on one or more of the servers 100.

In the example of a multi-party video conference, at least some of the user devices 104 may have cameras capturing the participant, such as a headshot of the participant, and/or at least some of the user devices 104 may capture content being displayed on the user devices 104. In yet other examples, content, such as pre-recorded or live videos, can be injected into the video conference by a user device 104 or by the communication services 102. These video streams may be sent to the media conferencing service 102 for transmission to some or all of the user devices 104 of the video conference. Upon reception, the user devices 104 may display the video stream associated with a current speaker of the video conference, such as a headshot of the current speaker, while the remaining participants of the video conference may be displayed in a grid layout using, for example, a tile for each participant. As the speaker in the video conference changes, the content being displayed on the user device 104 can change correspondingly. In some examples, all of the participants of the video conference may be displayed in individually tiles of an equal size.

As described in greater detail below, if the hardware, software, and/or network capabilities of at least one of the user devices 104 participating in the video conference is insufficient to enable an acceptable video conference experience, then a video processing system 110 may combine at least some of the video streams received at the media conferencing service 102 into a composite video stream that is transmitted to the least one of the user devices 104. The hardware, software, and/or network capabilities of the user device 104 may be insufficient if the capabilities do not satisfy one or more thresholds. The composite video stream may be encoded at a particular resolution, frame rate, color profile, and/or size, or using a particular codec that requires less processing and/or bandwidth for transmission and reception than the processing and/or bandwidth required to individually transmit and receive the plurality of video streams. In some examples, the composite video stream may be upsampled to a higher resolution to match a standard resolution, such as 4K resolution, and/or the frame rate of the composite video can be increased. The video streams that are combined can include the video stream from the current speaker of the video conference and any other video streams that are displayed at the same time. For example, a video stream of the current speaker and video streams of a plurality, such as three, of other participants of the video conference may be displayed on a user device 104 at the same time. In another example, content, such as a presentation, being displayed by the current speaker and video streams of the plurality of other participants of the video conference may be displayed on the user device 104 at the same time. There may be one or more video streams that are not displayed by the user device 104 due to display size restrictions or user preferences. For example, a display of a smartphone device may only display four video streams or tiles. In such an example, four video streams, including the video stream for the current speaker, may be combined by the video processing system 110 and transmitted to the user device 104. In another example, a larger display, such as a display of a television, may be sized to display twenty video streams or tiles. In this example, the twenty video streams may be combined by the video processing system 110 and transmitted to the user device 104. The video processing system 110 may create a plurality of different combined video streams including at least some of the individual video streams received from the user devices 104 based on the displays size and user preferences of the different participants in the video conference. For example, four video streams may be combined into one combined video stream that is transmitted to a smartphone device of a participant in the video conference, whereas twenty video streams may be combined into another video stream that is transmitted to a television of another participant in the same video conference. In another example, a composite video stream may be transmitted to one participant of the video conference, while individual video streams may be transmitted to another participant of the video conference. For example a composite video stream may be transmitted to a television while individual video streams may be transmitted to a smartphone device.

The video processing system 110 may store hardware capabilities, software capabilities, network capabilities, and/or user preferences for display of the video conference for each user device 104 within a datastore 108. The hardware, software, and/or network capabilities of the user devices 104 stored in the datastore 108 may include maximum or available hardware, software, and/or network capabilities of the user devices 104.

The maximum hardware capabilities of the user device 104 may include a processing capability of a central processing unit (CPU) of the user device 104, a processing capability of a graphics processing unit (GPU) of the user device 104, an amount of random-access memory (RAM) of the user device 104, a memory bandwidth of the user device 104, a bus speed of the user device 104, an amount of storage of the user device 104, a battery size of the user device 104 (if the user device 104 is battery-powered), a capability of a display of the user device 104, or the like. In some embodiments, the maximum hardware capabilities of the user device 104 that are stored in the datastore 108 may be the maximum value for each capability, such as the maximum CPU speed, the number of cores of the CPU, the maximum GPU speed, the number of cores of the GPU, the number of frames per second of the GPU, the gigabytes of RAM, the maximum memory bandwidth, the bus speed, the gigabytes or terabytes of storage of a disk drive, the milliamp hours of a battery, the size of a display, the maximum resolution of the display, or the like. In some embodiments, the maximum hardware capabilities of the user device 104 that are stored in the datastore 108 may be an identifier of the user device 104, or identifiers of the components of the user device 104, such as model identifiers of the CPU, the GPU, the RAM, the disk drive, the battery, and the display. In such embodiments, the maximum value for each capability of the user device 104 may be determined by looking up the maximum value in a component database based on the identifier of the user device 104 or the identifiers of the components of the user device 104.

The available hardware capabilities of the user device 104 may include an available processing capability of the CPU of the user device 104, an available processing capability of the GPU of the user device 104, an available amount of RAM of the user device 104, an available memory bandwidth of the user device 104, an available bus speed of the user device 104, an available amount of storage of the user device 104, a remaining amount of power of the battery of the user device 104, an area of a window displaying the video conference, a current resolution setting of the display of the user device 104, or the like. In such embodiments, the available hardware capabilities of the user device 104 may be determined and transmitted to the media conferencing service 102, and stored in the datastore 108, upon establishing the video conference, upon the entry of the user device 104 into the video conference, and/or periodically, such as at predetermined time intervals during the video conference.

The maximum software capabilities of the user device 104 may include the types of decoders of the user device 104 or the maximum number of video streams that can be simultaneously decoded by the user device 104. The types of decoders are indicative of the video formats that can be decoded by the user device 104. The maximum number of video streams that can be simultaneously decoded by the user device 104 may be limited by the capabilities of the software decoder or by licensing limitations. The available software capabilities of the user device 104 may include the types of decoders that are available for the user device 104 or the remaining number of video streams that can be decoded by the user device 104. For example, if the user device 104 is simultaneously decoding two video streams, then the software capabilities of the user device 104 may only enable one additional video stream to be decoded. In such an example, a plurality of video streams of the video conference may be combined to transmit a single composite video stream to the user device 104.

The maximum network capabilities of the user device 104 may include a maximum bandwidth of the network connection of the user device 104 or the type of network connection of the user device 104. The maximum network connection may be known by the type of network connection and may be limited by the Internet Service Provider ("ISP") plan of the network to which the user device 104 is connected. For example, the ISP plan may provide for a maximum bandwidth of 100 gigabits per second. In another example, the type of network connection may be the modality used by the user device 104 to connect to the media conferencing service 102. For example, if the user device 104 is connected to the media conferencing service 102 via a mobile internet connection, such as a 4G connection, then the maximum bandwidth may be limited relative to an enterprise connection. In another example, if the user device 104 is connected via a wireless connection, such as a Wi-Fi connection, then the maximum bandwidth may be limited relative to a wired connection, such as an ethernet connection. In yet another example, a cost associated with the network connection may be associated with the type of network connection of the user device 104. For example, if the user device 104 is connected to the media conferencing service 102 via a mobile internet connection, then there may be a cap on the amount of data that can be received over that connection over a predetermined time period, or there may be a cost associated with the reception of data of that connection. The maximum network bandwidth may be determined based on settings of the user device 104, an identifier of the type of connection, an identifier of the ISP or network provider, and/or may be provided by the participant of the user device 104. In some embodiments, the maximum network capabilities of the user device 104 that are stored in the datastore 108 may be the maximum value for the network capability, such as the maximum bandwidth, or may be an identifier of the type of connection, such as a mobile, wireless, or wired connection, or an identifier of the network provider, such an identifier of a network plan and/or an identifier of the ISP.

The available network capabilities of the user device 104 may include an available network bandwidth, latency, packet loss, or number of active connections measured by a program or a script. For example, when the user device 104 connects to the media conferencing service 102, the available network bandwidth, latency, and/or packet loss may be determined by a network test program executed by the user device 104. The available network bandwidth, latency, and/or packet loss of the network connection of the user device 104 may be measured and transmitted to the media conferencing service 102 and stored at the datastore 108 upon establishing the video conference, upon the entry of the user device 104 into the video conference, and/or periodically, such as at predetermined time intervals, during the video conference. The available network capability stored at the datastore 108 may be the available upload and/or download bandwidth, the latency, the packet loss, or the number of active connections of the network connection of the user device 104.

The datastore 108 may be implemented as one or more databases stored on one or more data storage devices and/or data storage systems. In embodiments, capabilities of the user devices 104 may be partitioned into two or more partitions in the datastore 108. For example, the hardware capabilities of the user devices 104 may be partitioned into maximum hardware capabilities and available hardware capabilities. The software capabilities of the user devices 104 may be partitioned into maximum software capabilities and available software capabilities. The network capabilities of the user devices 104 may be partitioned into maximum network capabilities and available network capabilities. Note that, in embodiments, the servers, partitions, and/or data storage devices or systems may be distributed across two or more data centers.

In an embodiment, components of the video processing system 110 may be implemented on one or more backend servers in the context of the Web services framework. Note, however, that one or more components of video processing system 110 may be implemented on one or more of the Web services frontend servers 100. However, one or more backend servers (in the context of the Web services framework) that each implement one or more instances of one or more components of the video processing system 110 may be considered frontend servers of the video processing system 110 itself, while one or more instances of one or more other components of the video processing system 110 may be implemented on backend servers in the context of the video processing system 110.

In an embodiment, the video processing system 110 may determine whether and when to switch the video conference from transmitting individual video streams to transmitting a composite video stream including a combination of at least two of the individual video streams. The determination of whether to combine the individual video streams may be based on the hardware, software, and/or network capabilities of one or more user devices 104 participating in the video conference. For example, if a video conference includes twenty participants that are all shown on a television display, the maximum processing capability of the television may not be able to sufficiently decode twenty individual video streams. If the video processing system 110 determines that the maximum processing capability of the television is below a threshold level of processing necessary to decode twenty individual video streams, the video processing system 110 may combine the twenty individual video streams into a single composite video stream that can be sufficiently decoded by the processor of the television. In another example, if a mobile connection of a smartphone is weak such that the smartphone cannot simultaneously receive four individual video streams for display during the video conference, the video processing system 110 may determine that the available bandwidth is below a threshold level of bandwidth necessary to receive four individual video streams. The video processing system 110 may then combine the four individual video streams into a single composite video stream that is encoded at a bit rate, frame rate, size, resolution, and/or format that can sufficiently be downloaded by the smart phone over the weak mobile connection. In yet another example, a battery-powered user device 104 may be at 20% power capacity. The video processing system 110 may determine that the available power capacity of the battery-powered user device 104 is below a threshold level and subsequently combine individual video streams into a single composite video stream that can be received and decoded by the battery-powered user device 104 using less energy.

The video processing system 110 may also change the encoding of the combined video stream based on the available hardware, software, and/or network capabilities. For example, if a user device 104 begins to run another application in the background of the video conference, the processing capabilities of the CPU or GPU, or the available amount of RAM, of the user device 104 may be lowered. In such an example, the resolution, size, frame rate, color spectrum, etc., of the combined video stream or the codec used to encode the combined video stream may be changed to require less hardware resources from the user device 104. In another example, a participant may reduce the size of the window used to display the video conference following the start of the video conference. In such an example, the size and or resolution of the composite video stream may be lowered to save hardware and software capability or network resources. In yet another example, the battery of the user device 104 may gradually decrease following the start of the video conference. In such an example, the resolution, size, frame rate, color spectrum, etc., or codec of the combined video stream may be changed to reduce the energy required to decode the video stream. For example, the video processing system 110 may encode the combined video stream at the high efficiency H.265 codec relative to the standard H.264 codec used to transmit the individual video streams. In still another example, a mobile user device 104 may change its location from the start of the video conference such that the signal strength of the mobile connection weakens, and subsequently the available network bandwidth lowers. In such an example, the video processing system 110 may change the encoding parameters of the combined video stream by, for example, reducing the resolution to reduce the bandwidth necessary for downloading the combined video stream.

The video processing system 110 can also adjust the parameters of encoding the composite video stream based on participant preferences. For example, a participant associated with the user device 104 may require that the media conferencing service 102 change from transmitting individual video streams to a composite video stream when the number of participants in the video conference exceeds a threshold number, such as eight participants. In another example, a participant associated with the user device 104 may require that the media conferencing service 102 change from transmitting individual video streams to a composite video stream when the quality of the video being displayed on the user device becomes unacceptable. For example, when the resolution of the individual video streams are below high definition, or when a threshold number of frames are dropped, the participant and/or the media conferencing service 102 may require a composite video stream.

The media conferencing service 102 can also switch between transmitting individual video streams and transmitting a composite video streams, or vice versa, following the start of the video conference. For example, as explained above, lower available bandwidth may necessitate the switch to a composite video stream. However, if the available bandwidth increases based on lowered network congestion or based on movement of a mobile user device 104 to a location with a stronger connection, the combining of the individual video streams may be halted and the individual video streams may then be transmitted, thereby saving computing power of the servers 100 and associated costs. In another example, if a battery-powered user device 104 is charged such that battery power increases over the threshold level, the combining of the individual video streams may be halted and the individual video streams may then be transmitted. In yet another example, if background applications running on a user device 104 are closed, then the available processing power of the CPU of the user device 104 may increase. In this example, the combining of the individual video streams may be halted and the individual video streams may be transmitted.

Embodiments of the video processing system 110 as described herein may be implemented according to an architecture that is linearly scalable. Embodiments may be scaled quickly and easily with little or no risk of losing encoding preferences and requirements, with minimum or no downtime, and without affecting the latency of the overall system. Servers 100 may be added as needed to support additional processing as needed by the video processing system 110 to combine a greater number of individual video streams in a single video conference, or to combine video streams in a greater number of video conferences.

Figure 2:
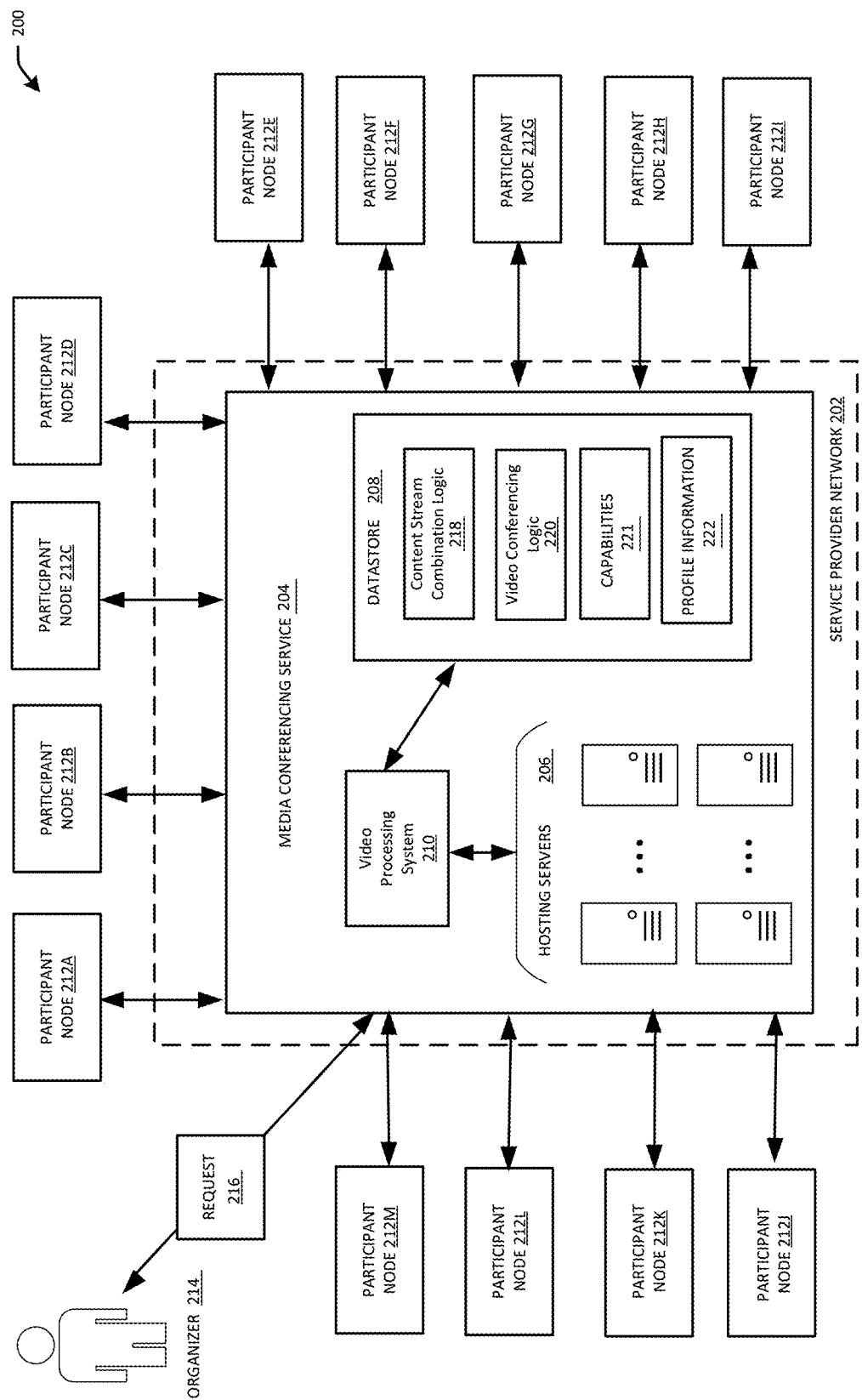
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-M, which can be the user devices 104. For example, the service provider network 202 can provide computing resources, like Virtual Machine (VM) instances and storage, on a permanent or an as-needed basis. In particular, the computing resources provided by the service provider network 202 can include various types of computing resources, such as data processing resources like VM instances, data storage resources, networking resources, data communication resources, network services, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a media conferencing service 204, such as a video conferencing service. The media conferencing service 204 may include multiple hosting servers 206. In some embodiments, the multiple hosting servers 206 may be the frontend servers 100 and located in multiple geographical locations. In some embodiments, the media conferencing service 204 also includes a datastore 208 and a video processing system 210. In some embodiments, the video processing system 210 may be the video processing system 110. The media conferencing service 204 may facilitate initiation of the media conference or may otherwise allow the media conference to take place via hosting server (or servers) 206.

Multiple participant nodes 212A-M are illustrated in the example environment 200. The participant nodes 212A-M represent participants, user devices, clients, bots, and/or users for media conferences provided by the media conferencing service 204. The media conferences may be, for example, the communications services 102. The participant nodes 212A-M interact with the media conferencing service 204 and the hosting servers 206 via electronic devices such as, for example, smart phones, tablets, laptop computers, desktop computers, telephones, etc. In some embodiments, at least one of the participant nodes 212A-M may be a bot that is configured to interact in the video conference instead of a human participant. In configurations, the media conferences may comprise text, audio, and/or video, e.g., one or more of the participant nodes 212A-M may participate in a media conference that includes both audio and video. Text, audio, and/or video content can be sent between the participant nodes 212A-M via the media conferencing service 204. The media conference may be part of a gaming platform.

When one or more of the participant nodes 212A-M wish to participate in a media conference, an organizer 214 of the media conference may send a request 216 for the media conference to the media conferencing service 204. The organizer 214 may also be a participant in the media conference.

The video processing system 210 may gather and evaluate hardware and/or network capabilities of the participant nodes 212A-M using the media conferencing service 204. The video processing system 210 may determine whether and when to combine video streams received from the participant nodes 212A-M based on the hardware and/or network capabilities of the participant nodes 212A-M. In some embodiments, the video processing system 210 may continually monitor the available hardware and/or network capabilities of the participant nodes 212A-M of a media conference. For example, if additional participant nodes 212A-M join the media conference or if participation nodes 212A-M leave the media conference before the media conference is completed, the video processing system 210 may determine to switch between sending individual video streams or a composite video stream based on the hardware and/or network capabilities of the updated participant nodes 212A-M. The dynamic evaluation of ongoing media conferences may also take into account the hardware, software, and/or network constraints, and/or the participant preferences.

Information from the video processing system 210 can be sent to the datastore 208, or information can be sent from the datastore 208 to the video processing system 210. For example, the content stream combination logic 218 of the datastore 208 can include details of the various codecs used for combining and encoding the video streams. For example, the content stream combination logic 218 can also include instructions for encoding the composite video stream at different sizes, resolutions, frame rates, and layouts. The video conferencing logic 220 includes instructions for establishing and conducting multi-party media conferences, such as multi-party video conferences. The hardware and/or network capabilities of the participant nodes 212A-M, in addition to identifiers of the user devices and/or components of the user devices can be received and stored in the capabilities database 221. The profile information for each participant of the media conferencing service 204 can be saved in the profile information database 222. The profile information for each participant or organization can include an identifier of the participant, an identifier of the organization associated with the participant, participant demographic information such as gender, age, occupation, income, marital status, etc., and media conference preferences of the participant. In some embodiments, the preferences of the participant or the organization can include preferences for whether and when to switch from transmitting individual video streams to transmitting a combined video stream. The preferences of the participant or the organization can also include a geographic region in which to combine the individual video streams for security, cost, and/or performance reasons.

Figure 3:
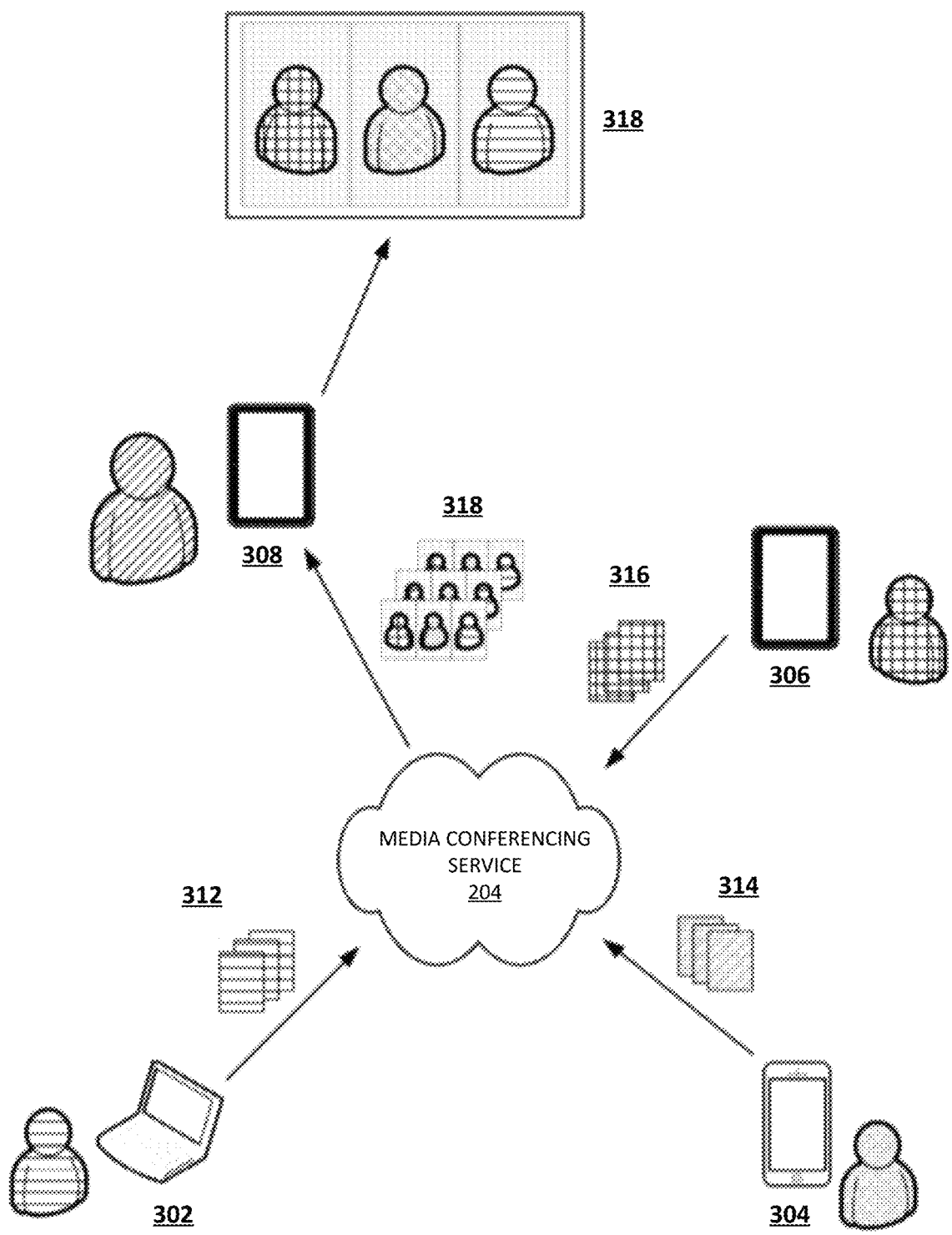
FIG. 3 schematically illustrates an example of combining multiple video streams using the media conferencing service.

FIG. 3 schematically illustrates an example of combining multiple video streams using the media conferencing service 204. For example, four user devices 302, 304, 306, 308 engage in a four-party video conference via the media conferencing service 204. The four user devices 302, 304, 306, 308 can be the user devices 104 of FIG. 1 and/or the participant nodes 212A-M of FIG. 2. In the example illustrated in FIG. 3, three of the user devices 302, 304, 306 capture video of the associated participant for transmission to the fourth user device 308. The first user device 302 captures first video stream 312, the second user device captures second video stream 314, and the third user device 306 captures third video stream 316. Although the fourth user devices 308 is not illustrated as capturing video in FIG. 3, it will be understood that in some embodiments, the fourth user device 308 can also capture video to be transmitted to the other three user devices 302, 304, 306. In a traditional video conference, each of the individual video streams 312, 314, 316 from the three user devices 302, 304, 306 is individually transmitted to the fourth user device 308 for output. However, when the media conferencing service 204 determines that the first, second, and third video streams 312, 314, 316 should be combined, the video processing system 210 may combine the first, second, and third video streams 312, 314, 316 into composite video stream 318. The media conferencing service 204 may determine to combine the first, second, and third video streams 312, 314, 316 if the fourth user device 308 is not capable of individually consuming the first, second, and third video streams 312, 314, 316. For example, the maximum or available hardware, software, and/or network capabilities of the fourth user device 308 may not satisfy one or more thresholds, as explained above. For example, the available processing capability of the fourth user device 308 may be lower than a processing threshold required to output three individual video streams. In such an example, the composite video stream 318 is created by combining the first, second, and third video streams 312, 314, 316, thereby requiring the fourth user device 308 to only output a single video stream. The composite video stream 318 can then be transmitted for output on the fourth user device 308.

Each frame of the composite video stream 318 includes image data from the three independently encoded video streams 312, 314, 316, as illustrated in FIG. 3. In some embodiments, metadata may identify each of the regions of a frame of the composite video stream 318 corresponding to image data from frames of the three independently encoded video streams 312, 314, 316. That is, the metadata for each of the three independently encoded video streams 312, 314, 316 can be used to generate metadata for the composite video stream 318 that define the frames of the composite video stream 318 as constituent tiles.

The video decoder on the fourth user device 308 conventionally decodes the combined video stream 318 to output frames of video in which the other participants are shown. In some embodiments, the combining of the first, second, and third video streams 312, 314, 316 by the video processing system 210 may be performed with low latency to support real-time communication sessions among multiple, geographically distributed participants.

Figure 4:
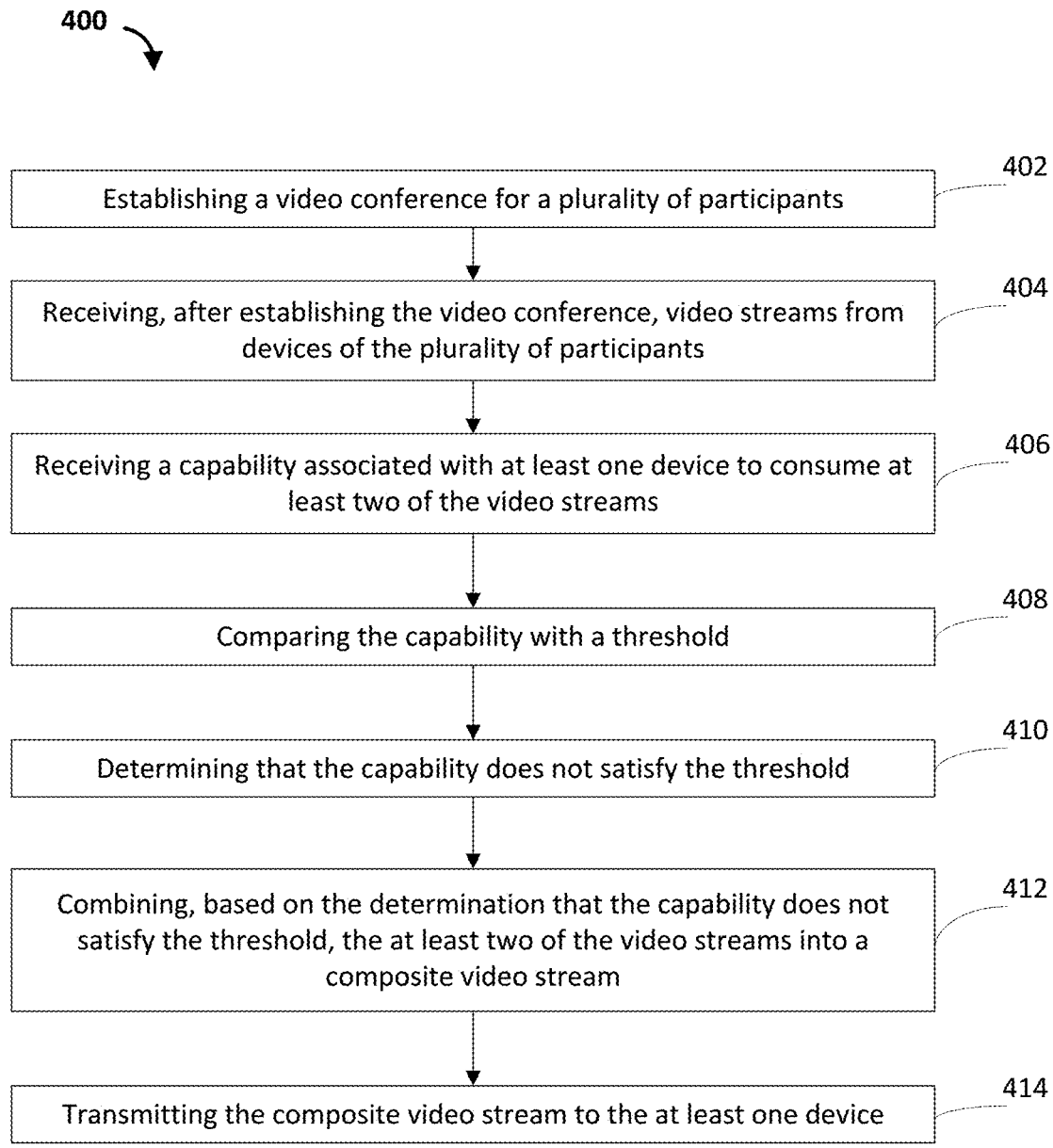
FIG. 4 is a flowchart showing an example process for combining multiple video streams using the media conferencing service.

FIG. 4 illustrates a flow diagram of an example method 400 that illustrates aspects of the functions performed at least partly by the service provider network 202. The example method 400 may be implemented to combine multiple video streams using the media conferencing service 204. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 402, the media conferencing service 204 establishes a media conference, such as a video conference. The video conference can be established between the organizer 214 and one of more of the participant nodes 212A-M, or only between the participant nodes 212A-M. The video conference can include video of the participants and/or content being presented by the participant nodes 212A-M, such as a presentation or a gaming session.

The video conference can be established by the media conferencing service 204 in response to a request 216 from the organizer 214. The request 216 may include an identifier of the organizer 214, identifiers of the participant nodes 212A-M, a date, time, and/or duration for the video conference. The request 216 may also include an anticipated location for each participant node 212A-M. The participants, such as the organizer 214 and the participant nodes 212A-M, of the video conference may belong to the same organization or may belong to different organizations, such as different corporations.

At block 404, individual video streams from at least some of the plurality of user devices participating in the video conference are received at the media conferencing service 204 after establishing the video conference. In some embodiments, video streams can be received from some, but not all, of the plurality of devices participating in the video conference. In some embodiments, video streams can be received from all of the plurality of devices participating in the video conference. A video stream may be received from a camera of a user device capturing, for example, a headshot of the participant associated with the user device. The video stream may include content being displayed by the user device, such as a presentation or a gaming session. The video stream may also include both a headshot of the participant and the content being displayed by the user device. In some embodiments, video content can be injected into the video conference. For example, prerecorded or live video may be inserted into the video conference at a particular time. In some embodiments, the media conferencing service 204 can then transmit the individual video streams to the participants of the video conference, as is traditionally done.

At block 406, a capability of at least one of the devices to consume at least two of the plurality of video streams can be received from the at least one user device. In some embodiments, the capability of the user device to consume the plurality of video streams can be the hardware and/or software capability of the user device or a network bandwidth of the user devices. In some embodiments, the capabilities of the hardware and software of the user device can be received from the participant associated with the user device. For example, the participant can provide at least one of a processing capability of the CPU of the user device, a processing capability of the GPU of the user device, an amount of the RAM of the device, a memory bandwidth, a bus speed, an amount of storage of the device, a battery size of the device, and/or a capability of a display of the device. As explained above, these hardware capabilities can be the maximum hardware capabilities of the user device or the available hardware capabilities of the user device. In another example, the participant can provide at least one of the types of decoders or a number of video streams that can be simultaneously decoded.

Figure 5:
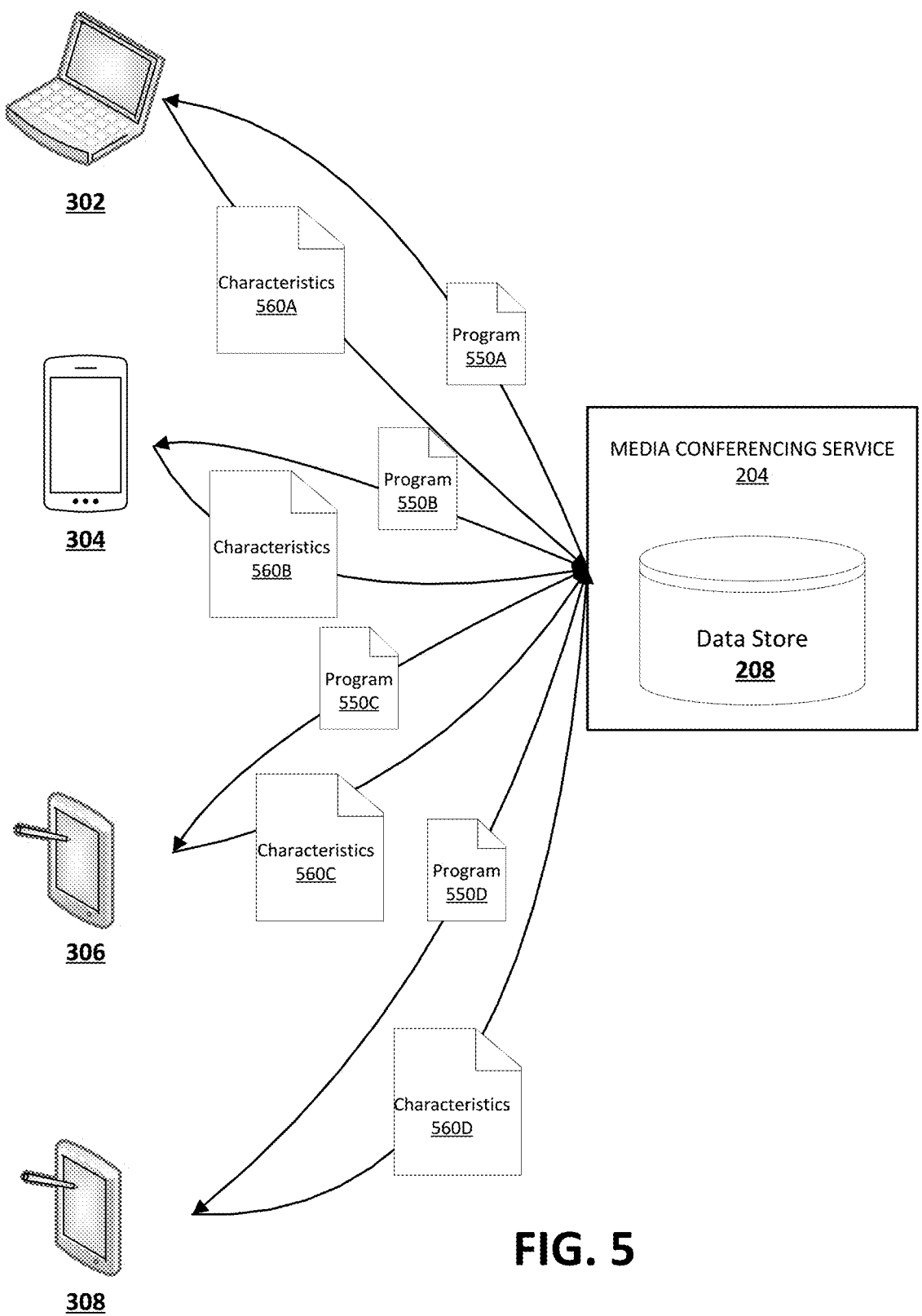
FIG. 5 schematically illustrates a high-level architecture of a plurality of user devices sending and receiving information to and from the media conferencing service.

Also as explained above, the maximum or available hardware or software capabilities can be automatically received from the user device executing a program. For example, FIG. 5 schematically illustrates a high-level architecture of a plurality of user devices 302, 304, 306, 308 sending and receiving information to and from the media conferencing service 204. As illustrated in FIG. 5, following the establishment of the video conference, the media conferencing service 204 may send a program 550 to the user devices 302, 304, 306, 308. The programs 550A-D can be, for example, JavaScript applications, scripts, cookies, tokens, metadata in the HTTP or Transport Layer Security protocols, or another tracer that can be used to identify capabilities of the user devices 302, 304, 306, 308 participating in the video conference. When each user device 302, 304, 306, 308 connects to the media conferencing service 204 for the first time, or any subsequent time, the program 550A-D may be sent to and received by the user device 302, 304, 306, 308. Follow execution of the program 550A-D, the user device 302, 304, 306, 308 can send the maximum and/or available hardware, software, and/or network capabilities 560A-D to the media conferencing service 204 upon establishing the video conference, upon the entry into the video conference, and/or at periodic intervals during the video conference. Once the program 550A-D is stored on the user device 302, 304, 306, 308, the same program may be invoked for future media conferences. The maximum and/or available hardware, software, and/or network capabilities 560A-D can be saved in the datastore 208, such as in capabilities database 221. A profile or record of a participant stored in the profile information database 222 can be associated with the maximum and/or available hardware, software, and/or network capabilities 560A-D for the respective participant.

Execution of the program 550A-D may cause the identification of various hardware components, software packages, and/or network components of the user devices 302, 304, 306, 308. For example, execution of the program 550A-D may cause a identifier of the user device itself and/or of each component of the user device 302, 304, 306, 308 to be determined and sent to the media conferencing service 204. For example, model identifiers of the CPU, the GPU, the RAM, the disk drive, the battery, and the display of each user device 302, 304, 306, 308 may be determined and sent to the media conferencing service 204. In such embodiments, the maximum value for each capability of the user device 302, 304, 306, 308 may be determined by looking up the maximum value in a component database based on the identifier of each user device 302, 304, 306, 308 or on the identifiers of the components of each user device 302, 304, 306, 308. Execution of the program 550A-D may also cause the available hardware capabilities of each user device 302, 304, 306, 308 to be determined in real-time or at periodic intervals. For example, the processing load on the CPU of each user device 302, 304, 306, 308 can be monitored during the duration of the video conference. In another example, the remaining battery life of each user device 302, 304, 306, 308 can be monitored during the duration of the video conference.

In some embodiments, execution of the program 550A-D may cause a identifier of the decoding software, identifiers of the codecs, and licensing restrictions of the decoding software or geographic location of to be determined and sent to the media conferencing service 204. The video encoding formats that can be decoded by each user device 302, 304, 306, 308 can be determined based on, for example, the identifier of the decoding software or the identifiers of the codecs. In addition, the additional video streams that can be decoded by each user device 302, 304, 306, 308 can be determined based on, for example, the licensing restrictions of the decoding software and the number of current video streams being decoded by the software of each user device 302, 304, 306, 308.

In some embodiments, execution of the program 550A-D may cause a identifier of the type of network connection, an identifier of a network provider, such an ISP, and/or an identifier of a modality of connection to be determined and sent to the media conferencing service 204. The maximum network capabilities of each user device 302, 304, 306, 308 can be determined based on the type of network connection, the network provider, and/or the modality of connection. The maximum network capabilities of the user device 104 may include a maximum bandwidth of the network connection used by the user device 302, 304, 306, 308 to participate in the video conference. Execution of the program 550A-D may also cause the available network capability of each user device 302, 304, 306, 308 to be determined in real-time or at periodic intervals. The available network capability of each user device 302, 304, 306, 308 may be the available upload and/or download bandwidth.

In some embodiments, the media conferencing service 204 may forward the program 550A-D to the user devices 302, 304, 306, 308 or the participant nodes 212A-M only the first time the user devices 302, 304, 306, 308 connects to the media conferencing service 204. In some embodiments, the media conferencing service 204 may forward the program 550A-D to the user devices 302, 304, 306, 308 or the participant nodes 212A-M each time a video conference is established. In some embodiments, the media conferencing service 204 may forward the program 550A-D to the user devices 302, 304, 306, 308 or the participant nodes 212A-M at periodic intervals, such as a predetermined time period, such as once a month, or following a predetermined number of video conferences. In such an example, the media conferencing service 204 may first forward the program 550A-D to the user devices 302, 304, 306, 308 or the participant nodes 212A-M following participation in, for example, five, ten, or twenty video conferences.

At block 408, the media conferencing service 204 compares the capability of at least one of the devices to consume the at least two of the video streams to one or more thresholds. The one or more thresholds may ensure a sufficient participant experience during the video conference. The one or more thresholds may be variable depending on the number of participants in the video conference, the type of content being displayed in the video conference, and the number of video tiles being concurrently simultaneously displayed on a user device. For example, if each video stream received from a user device requires 150 kilobits per second to download from the media conferencing service 204, and if four tiles are being simultaneously displayed on a user device, the threshold available network bandwidth for the user device must be at least 600 kilobits per second.

At block 410, the media conferencing service 204 may determine that the capability of the at least one of the user devices to consume the at least two of the video streams does not satisfy the one or more thresholds. In such a scenario, the media conferencing service 204 may determine that the at least one user device is not capable of individually consuming the at least two video streams. For example, if the available network bandwidth is less than 600 kilobits per second, then the media conferencing service 204 may determine that the network threshold is not satisfied. In another example, if more than a threshold number of frames are being dropped at a user device during the video conference, then it is determined that the available hardware, software, and or network capabilities of that user device do not satisfy the threshold. In yet another example, the media conferencing service 204 may determine that a user device can, at most, display six individual video streams based on an identifier of the user device or of a component within the user device. In such an example, if the video conference includes ten participants, then the media conferencing service 204 may determine that the ten video streams exceeds the six individual video stream threshold that may be simultaneously displayed by the user device. In still another example, a user device may concurrently run a processing intensive application during the video conference, thereby reducing the available processing power available to the user device. In such an example, the available processing power may not satisfy a threshold for decoding a plurality of individual video streams of the video conference. In another example, one Ghz of processing power may be required to simultaneously output the multiple video streams of a video conference. A user device may have a processor with a maximum processing capability of two or more Ghz. In such an example, the user device is capable of sufficiently outputting the multiple video streams, thereby not requiring the combining of the multiple video streams. However, if the user device is running another application, leaving only 500 Mhz of processing capability available, then the processing capability may not be sufficient to output the multiple video streams. In such an example, the multiple video streams may be combined into a composite video stream that can be output sufficiently using 500 megahertz or less of processing capability. In still another example, a user device may only have 35% battery life remaining. Knowing that the video conference is scheduled for a duration of two hours, the media conferencing service 204 may determine that the battery life of the user device is not sufficient to last the entire duration of the video conference while outputting multiple video streams. In such an example, unless the participant charges the battery of the user device, the multiple video streams may be combined into a composite video stream that can be output using less energy, thereby enabling the user device to be powered until completion of the video conference.

Although blocks 406-410 have been explained as occurring at the media conferencing service 204, in some embodiments, the determination of the maximum and/or available hardware and/or network capabilities, the comparison of such capabilities, and the determination that such capabilities do not satisfy one or more thresholds can be performed at the user devices. Following the determination that the maximum and/or available hardware, software, and/or network capabilities do not satisfy the one or more thresholds, the user device can then send a request to the media conferencing service 204 for the composite video stream. In some embodiments, a participant associated with the user device can select to receive a composite video stream, regardless of the capabilities of the user device. In such embodiments, the user device can then send a request to the media conferencing service 204 for the composite video stream.

At block 412, the media conferencing service 204 may combine the at least two individual video streams into a composite video stream for a user device that does not satisfy the threshold, i.e., a user device that is not capable of individually consuming the at least two video streams. The particular video streams that may be combined can be those that are currently being displayed by the user device. For example, if a video conference includes three participants, the second and third video streams may be combined for display to the first participant if the first participant is not capable of individually consuming the second video stream and the third video stream. In some embodiments, the video stream from the current speaker of the video conference may have a higher resolution or a larger size than the video streams of the other participants in the video conference. The video processing system 210 may combine the individual video streams by setting an aspect ratio of the composite video stream to match that of the display of the user device, by setting a resolution of the composite video stream to match that of the display of the user device, by setting a codec that has a more efficient compression algorithm to reduce the required bandwidth to download the composite video stream or that is supported by the user device, by setting or lowering a frame rate of the composite video stream to reduce the bandwidth required to download the composite video stream, by setting a size of the composite video stream to match the display window for the video conference on the user device, by setting a color coordinate that matches the display of the user device or that reduces the bandwidth required to download the composite video stream, or the like.

In some embodiments, the composite video stream can be processed to have a higher quality that the individual video streams making up the composite video stream. For example, the individual video streams may be upsampled to a higher resolution, the frame rate may be increased, color may be corrected, and lighting may be improved. In some embodiments, machine learning can be used to interpolate missing information in the received individual video streams. In such examples, there may not be hardware, software, and/or network constraints that may necessitate a lower bit rate.

At block 414, the media conferencing service 204 may transmit the composite video stream to the at least one user device. In some embodiments, each user device of the video conference may receive the same composite video stream. In some embodiments, a custom composite video may be sent to each user device depending on the hardware and network capabilities, as well as the participant preferences, of the user devices. In some embodiments, some of the participants of the video conference may receive a composite video stream, while other participants of the video conference may receive individual video streams that have not been combined. For example, due to the costs associated with combining the individual video streams at the media conferencing service 204, an organization may limit the number of composite video streams created by the video processing system 210. In such an example, a limited number, such as one, of user devices, can receive a composite video stream while the other user devices will receive individual video streams.

Figure 6:
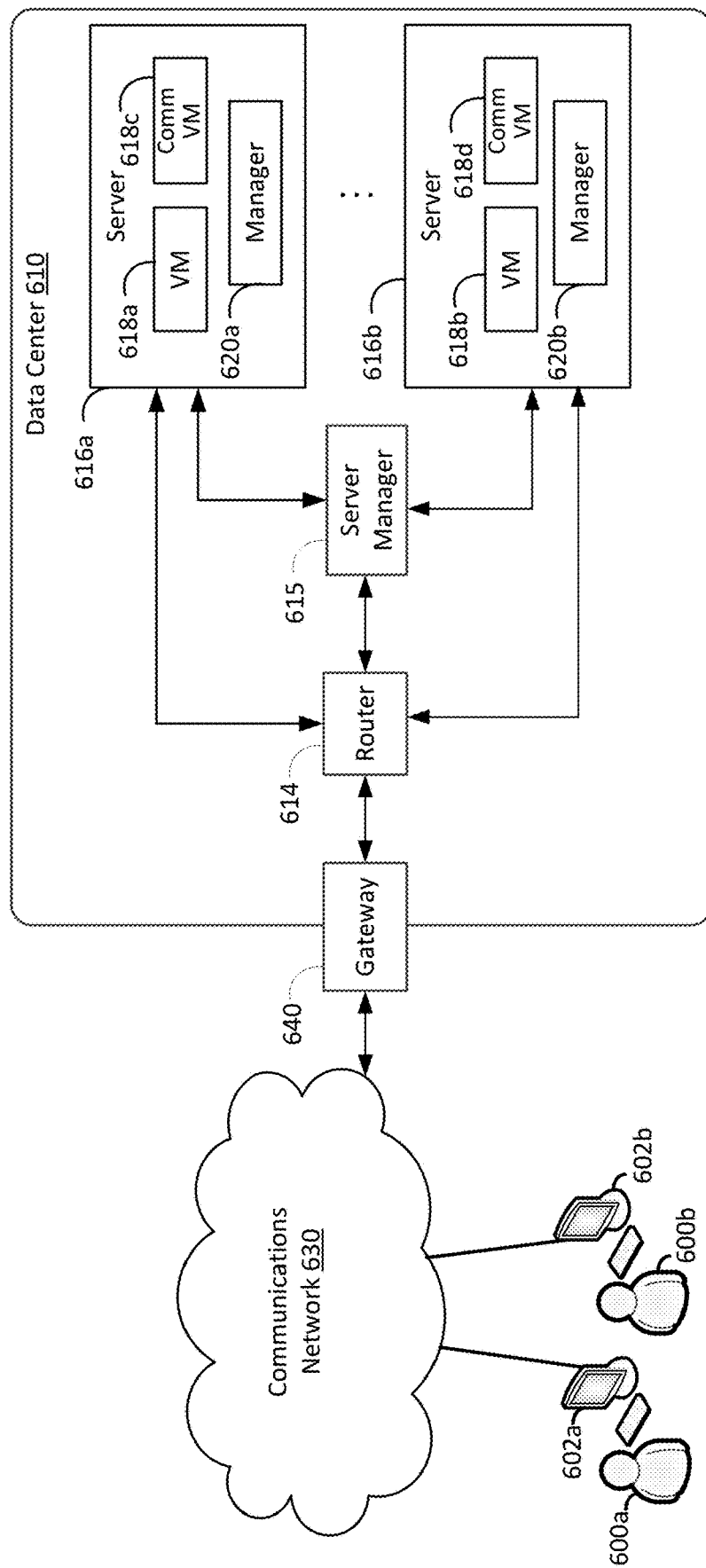
FIG. 6 is a diagram illustrating an example computing environment that may be used in some embodiments.

FIG. 6 illustrates an example computing environment in which the embodiments described herein may be implemented. The example computing environment of FIG. 6 may be configured to implement one or more of the services platform, such as the communications services 102, the video processing system 110, or a combination thereof of FIG. 1. The example computing environment of FIG. 6 may be configured to implement the media conferencing service 204 of FIG. 2. The example computing environment of FIG. 6 may be configured to implement any of the methods described herein, such as any methods (e.g., or any operations) associated with FIG. 4

FIG. 6 is a diagram schematically illustrating an example of a data center 610 that can provide computing resources to users 600a and 600b (which may be referred herein singularly as user 600 or in the plural as users 600) via user computers 602a and 602b (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and nonvolatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be communication service virtual machine. The communication service virtual machine instances 618c and 618d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 6 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602*a* or 602*b* may be a server, a desktop or laptop personal computer, a tablet computer, a wireless telephone, a personal digital assistant (PDA), an e-book reader, a game console, a set-top box or any other computing device capable of accessing data center 610. User computer 602*a* or 602*b* may connect directly to the Internet (e.g., via a cable modem or a Digital Subscriber Line (DSL)). Although only two user computers 602*a* and 602*b* are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620*a* or 620*b* (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616*a* and 616*b*. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616*a* and 616*b*. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, videogame consoles, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
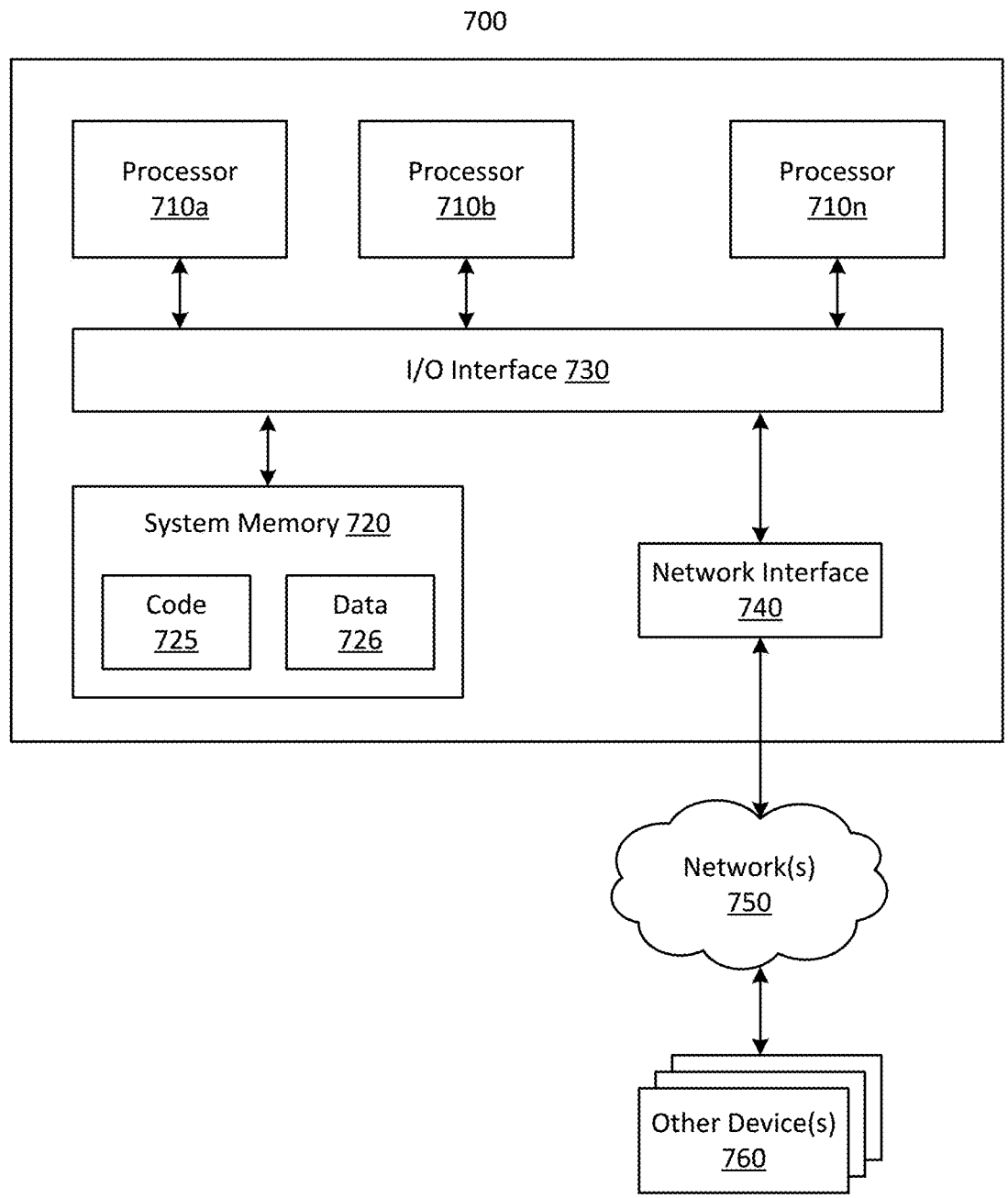
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement the communications services 102, the user devices 104, the video processing system 110, or a combination thereof of FIG. 1. The example computer system of FIG. 7 may be configured to implement the media conferencing service 204 of FIG. 2, the participant nodes 212A-M, or a combination thereof of FIG. 2. The example computer system of FIG. 7 may be configured to implement the participant devices 302-308 of FIGS. 3 and 5. The example computer system of FIG. 7 may be configured to implement any of the methods described herein, such as any methods (e.g., or any operations) associated with FIG. 4.

In the illustrated embodiment, computing device 700 includes one or more processors 710a, 710b and/or 710n (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 720 as code 725 and data 726.

In an embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 720 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method comprising:
   establishing a video conference between a first device of a first participant, a second device of a second participant, and a third device of a third participant;
   receiving, after establishing the video conference, a first video stream from the first device, a second video stream from the second device, and a third video stream from the third device;
   determining that the first device is not capable of individually consuming the second video stream and the third video stream, wherein the determining that the first device is not capable of individually consuming the second video stream and the third video stream comprises:
     receiving, from the first device, a capability associated with the first device, and
     determining that the capability associated with the first device does not satisfy a threshold;
   combining, based on the determination that the first device is not capable of individually consuming the second video stream and the third video stream, the second video stream and the third video stream into a composite video stream; and
   transmitting the composite video stream to the first device.

2. The method of claim 1, further comprising transmitting the first video stream and the third video stream individually to the second device.

3. The method of claim 1, wherein receiving the capability associated with the first device comprises receiving an identifier of the first device or an identifier of a component of the first device.

4. The method of claim 1, wherein the capability associated with the first device comprises a hardware capability, a software capability, or a network bandwidth.

5. A media conferencing service comprising:
   a computing node and a non-transitory computer-readable medium, the computer-readable medium having stored therein computer-readable instructions that, upon execution by the computing node, configure the service to perform operations comprising:
     establishing a video conference including video streams received from devices of a plurality of participants;
     receiving, from at least one of the devices, a capability associated with consuming at least two of the video streams;
     determining, based on the capability, that the at least one device is not capable of individually consuming the at least two of the video streams, wherein the determining, based on the capability, that the at least one device is not capable of individually consuming the at least two of the video streams comprises comparing the capability with a threshold to determine that the at least one device is not capable of individually consuming the at least two of the video streams;
     combining, based on determining that the at least one device is not capable of consuming the at least two of the video streams, the at least two video streams into a composite video stream; and
     transmitting the composite video stream to the at least one device.

6. The service of claim 5, wherein the computer-readable instructions upon execution further configure the service to perform operations comprising receiving, in response to establishing the video conference, the video streams from the devices of the plurality of participants.

7. The service of claim 5, wherein the computer-readable instructions upon execution configure the service to receive the capability associated with the at least one of the devices by invoking a computer program that is configured to determine the capability associated with the at least one of the devices.

8. The service of claim 5, wherein the computer-readable instructions upon execution configure the service to receive the capability associated with the at least one of the devices by receiving an identifier of the at least one of the devices or an identifier of a component of the at least one of the devices.

9. The service of claim 5, wherein the computer-readable instructions upon execution configure the service to receive the capability associated with consuming the at least two video streams by receiving a hardware capability associated with the at least one of the devices.

10. The service of claim 9, wherein the hardware capability associated with the at least one of the devices comprises at least one of a processing capability associated with a central processing unit (CPU) of the at least one of the devices, a processing capability associated with a graphics processing unit (GPU) of the at least one of the devices, an amount of random-access memory (RAM) of the at least one of the devices, a memory bandwidth, a bus speed, an amount of storage of the at least one of the devices, a battery size of the at least one of the devices, or a capability associated with a display of the at least one of the devices.

11. The service of claim 9, wherein the hardware capability associated with the at least one of the devices comprises at least one of an available processing capability associated with a central processing unit (CPU) of the at least one of the devices, an available processing capability associated with a graphics processing unit (GPU) of the at least one of the devices, an available amount of random-access memory (RAM) of the at least one of the devices, an available memory bandwidth, an available bus speed, an available amount of storage of the at least one of the devices, an available amount of battery life of the at least one of the devices, or a characteristic of a viewing window outputting the video conference.

12. The service of claim 5, wherein the computer-readable instructions upon execution configure the service to receive the capability associated with consuming the at least two video streams by receiving a software capability associated with the at least one of the devices.

13. The service of claim 12, wherein the software capability associated with the at least one of the devices comprises one or more types of decoders of the at least one of the devices or a number of video streams that can be simultaneously decoded by the at least one of the devices.

14. The service of claim 5, wherein the computer-readable instructions upon execution configure the service to receive the capability associated with consuming the at least two video streams by receiving a network capability associated the at least one of the devices.

15. The service of claim 14, wherein the network capability associated with the at least one of the devices comprises at least one of a maximum bandwidth of the at least one of the devices, an available bandwidth of the at least one of the devices, an amount of packet loss, a number of active connections, or a type of connection.

16. The service of claim 5, wherein the computer-readable instructions upon execution configure the service to combine at least two video streams into the composite video stream by encoding the composite video stream based on at least one of the capability associated with consuming the at least two video streams or a viewing preference of the participant associated with the at least one of the devices.

17. A non-transitory computer-readable storage medium having stored thereon computer-readable instructions, the computer-readable instructions comprising instructions that, upon execution on one or more computing devices, at least cause:
    establishing a video conference including video streams received from devices of a plurality of participants;
    receiving, from at least one of the devices, a capability associated with consuming at least two of the video streams;
    determining, based on the capability, that the at least one device is not capable of individually consuming the at least two of the video streams, wherein the determining, based on the capability, that the at least one device is not capable of individually consuming the at least two of the video streams comprises comparing the capability with a threshold to determine that the at least one device is not capable of individually consuming the at least two of the video streams;
    combining, based on determining that the at least one device is not capable of consuming the at least two of the video streams, the at least two video streams into a composite video stream; and
    transmitting the composite video stream to the at least one device.

18. The method of claim 1, further comprising:
    determining a change in a current capability of the first device; and
    changing, based on the change in the current capability of the first device, a parameter used to combine the second video stream and the third video stream into the composite video stream.

19. The method of claim 18, wherein the current capability is an available processing capability, an available memory capability, or an available bandwidth capability.

* * * * *